US011903392B2

(12) United States Patent
Van Neerven et al.

(10) Patent No.: US 11,903,392 B2
(45) Date of Patent: Feb. 20, 2024

(54) HYPOALLERGENIC INFANT FORMULA AND METHODS FOR PREPARING THE SAME

(71) Applicant: FrieslandCampina Nederland B.V., Amersfoort (NL)

(72) Inventors: Ruprecht Jules Joost Van Neerven, Wageningen (NL); Malgorzata Teodorowicz, Wageningen (NL); Hendrik Albertus Kosters, Wageningen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 812 days.

(21) Appl. No.: 16/928,719

(22) Filed: Jul. 14, 2020

(65) Prior Publication Data
US 2020/0345024 A1 Nov. 5, 2020

Related U.S. Application Data

(63) Continuation of application No. PCT/EP2019/050890, filed on Jan. 15, 2019.

(30) Foreign Application Priority Data

Jan. 16, 2018 (EP) .................... 18151910

(51) Int. Cl.
A23C 9/142 (2006.01)
A23L 33/19 (2016.01)
(Continued)

(52) U.S. Cl.
CPC .......... A23C 9/1422 (2013.01); A23C 9/1307 (2013.01); A23C 9/1322 (2013.01); A23L 33/19 (2016.08); A23L 33/40 (2016.08)

(58) Field of Classification Search
CPC ..... A23V 2250/55; A23L 33/40; A23L 33/18; A23L 33/19; A23J 1/205; A23J 3/30;
(Continued)

(56) References Cited

U.S. PATENT DOCUMENTS 4,981,704 A 1/1991 Thibault
5,112,812 A 5/1992 Samuelsson et al.
(Continued)

FOREIGN PATENT DOCUMENTS

EP 0 226 221 A1 6/1987
JP H02-138991 A 5/1990
(Continued)

OTHER PUBLICATIONS

Ruinemans-Koerts et al. The Basophil Activation Test redues the need for a food challenge test in children suspected of IgE-mediated cow's milk allergy. John Wiley& Sons, Ltd, 2018, pp. 350-356. (Year: 2018).*

(Continued)

Primary Examiner — Hong T Yoo
(74) Attorney, Agent, or Firm — Sunit Talapatra; Foley & Lardner LLP

(57) ABSTRACT

The invention relates to the field of infant nutritional formulations, in particular to methods for providing a hypoallergenic nutritional composition based on cow's milk protein for infants who are at risk of developing cow's milk allergy (CMA). The method comprises the steps of: (i) providing a partial hydrolysate of the milk protein(s), obtained by subjecting a starting composition comprising one or more bovine milk protein(s) in an aqueous medium to an enzymatic treatment, (ii) clearing the partial hydrolysate from one or more components capable of RAGE-binding and/or having a basophil degranulation inducing capacity; (iii) optionally concentrating the cleared partial
(Continued)

hydrolysate; and (iv) formulating the (concentrated) cleared partial hydrolysate into a nutritional composition for infants who are at risk of developing CMA.

14 Claims, 4 Drawing Sheets

(51) Int. Cl.
 *A23L 33/00* (2016.01)
 *A23C 9/13* (2006.01)
(58) Field of Classification Search
 CPC ........ A23J 3/04; A23C 9/1422; A23C 9/1307; A23C 21/00; A23C 9/1425; A23C 9/1322
 See application file for complete search history.

(56) References Cited

U.S. PATENT DOCUMENTS

| | | | |
|---|---|---|---|
| 5,405,637 | A | 4/1995 | Martinez et al. |
| 5,589,357 | A | 12/1996 | Martinez et al. |
| 6,777,391 | B1 | 8/2004 | Kratky et al. |
| 2001/0022986 | A1 | 9/2001 | Girsh |
| 2002/0061548 | A1 | 5/2002 | Emmerentia |
| 2003/0072863 | A1 | 4/2003 | Hayasawa et al. |
| 2006/0286252 | A1 | 12/2006 | Rangavajla et al. |
| 2010/0162418 | A1 | 6/2010 | Kanda et al. |
| 2010/0233318 | A1 | 9/2010 | Edens |
| 2010/0255153 | A1 | 10/2010 | Oestergaard et al. |
| 2013/0136769 | A1* | 5/2013 | Knippels ............. A61K 38/17 514/5.6 |
| 2014/0134293 | A1 | 5/2014 | Doring |
| 2015/0118351 | A1 | 4/2015 | Haschke et al. |

FOREIGN PATENT DOCUMENTS

| | | |
|---|---|---|
| JP | 723712 A | 1/1995 |
| JP | 2012-522498 A | 9/2012 |
| RU | 2428047 C1 | 9/2011 |
| WO | WO-87/03785 A1 | 7/1987 |
| WO | WO-93/04593 A1 | 3/1993 |
| WO | 93/24020 † | 12/1993 |
| WO | WO-93/24020 A1 | 12/1993 |
| WO | WO-01/68672 A1 | 9/2001 |
| WO | WO-2012/009426 A1 | 1/2012 |

OTHER PUBLICATIONS

A. Hest et al. "Hypoallergenic formulas—when, to whom and how long: after more than 15 years we know the right indication!" Allergy,2004;59;(Suppl 78);45-52.

A.Y. Tamime, Dairy Powders and Concentrated Products, 2009, pp. 257 and 263.

Alfonso Clemente, "Enzymatic protein hydrolysates in human nutrition" Trends in Food Science Technology, 2000;11;254-262.

Baskara et al, "Methodology for Determining Degree of Hydrolysis of Proteins in Hydrolysates: A Review" EMJ Allergy Immunol, 2017;2(1);87-93.

Boards of Appeal of The European Patent Office; Datasheet for the decision of Oct. 23, 2014 in Case No. T 1822/12-3.3.09; Application No. 04709050.1.

Boards of Appeal of The European Patent Office; Datasheet for the decision of Mar. 5, 2013 in case No. T 1039/09-3.3.04; Application No. 03741684.9.

Bu et al, "Milk processing as a tool to reduce cow's milk allergenicity: a mini-review" Dairy Sci & Technol, 2013; 93;211-223.

Businco et al, "Hydrolysed cow's milk formulae* Allergenicity and use in treatment and prevention. An ESPACI position paper" Pediatric Allergy and Immunology, 1993;4;101-111; ISSN 0905-6157.

Commission Directive 2006/141 /EC of Dec. 22, 2006 on infant formulae and follow-on formulae and amending Directive 1999/21/EC; Official Journal of the European Union, pp. 1-33; Dec. 30, 2006.

European Patent Office response to the Communication pursuant to Art. 94(3) EPC received in European Patent Application No. 19700595.2 dated Jul. 14, 2021; Nov. 9, 2021.

Floris, et al. (2010), "Trends in accident formulas: a daily perspective", Improving the Safety and Quality of Milk, pp. 454-474, Dec. 2010.

Gonzalez-Tello et al, "Communication to the Editor: D18 Enzymatic Hydrolysis of Whey Proteins. 2. Molecular-Weight Range" Biotechnol Bioeng, 1994;44(4);529-532.

Ifendu A. Nnanna et al., "Dairy Protein Hydrolysates" Handbook of Food Products Manufacturing, 2007, Chapter 72, p. 537-555.

John M. James et al, Food Allergy, 2012, p. 266; Elsevier Inc,; ISBN-13: 9781437719925.

Kiewiet et al. "Immunomodulating protein aggregates in soy and whey hydrolysates and their resistance to digestion in an in vitro infant gastrointestinal model: new insights in the mechanism of immunomodulatory hydrolysates" Food Funct., 2018, 9, 604; DOI: 10.1039/c7fo01537b.

Kiewiet et al. "Partially hydrolyzed whey proteins prevent clinical symptoms in a cow's milk allergy mouse model and enhance regulatory T and B cell frequencies" Mol. Nutr. Food Res, 61,11,2017,1700340; DOI 10.1002/mnfr.201700340.

Monaci et al., "Milk allergens, their characteristics and their detection in food: A review" Eur. Food. Res. Technol., 2006, 223, pp. 149.

Nakamura et al, "Antigenicity of Whey Protein Hydrolysates Fractionated with Ultrafiltration Membrane" (113) Nippon Shokuhin Kogyo Gakkaishi, 1992;39(1); 113-116.

Rutherfurd et al., "Methodology for Determining Degree of Hydrolysis of Proteins in Hydrolysates: A Review" AOAC International, 2010, vol. 93, pp. 1515.

Sereda et al, "Whey proteins hydrolysis using Alcalase and Flavourzyme" IOP Conf Series: Earth and Environmental Science, 2022;1052;1-6.

Teodorowicz et al, "Food Processing: The Influence of the Maillard Reaction on Immunogenicity and Allergenicity of Food Proteins" Nutrients, 9, 835; 2017, pp. 1-18.

Turck et al, "Scientific and technical guidance for the preparation and presentation of an application for authorisation of an infant and/or follow-on formula manufactured from protein hydrolysates" EFSA Journal, 2017;15(5);4779.

Zheng, et al. (1998), "Decoloring of Dyeing Effluent with Modified Keratin Proteolytic Products", Journal of Sichuan Union University, vol. 2, No. 2, pp. 18-22, Mar. 1998.

Boyle et al., "Hydrolysed formula and of allergic or autoimmune disease: systematic review and meta-analysis", BMJ, 2016, (11 pages).

International Search Report for PCT/EP2019/050890 dated Feb. 27, 2019 (5 pages).

Lee et al., "Analysis of Maillard reaction products, carboxymethyllysine, furosine, hydroxymethylfurfural, furan and acrylamide during processing infant formula", The FASEB Journal, vol. 30, Issue S1, Apr. 1, 2016, Abstract Only (2 pages).

Liu et al., "Generation of Soluble Advanced Glycation End Products Receptor (sRAGE)-Binding Ligands during Extensive Heat Treatment of Whey Protein/Lactose Mixtures Is Dependent of Glycation and Aggregation", Journal of Agricultural and Food Chemistry, 2016, 64, p. 6477-6486 (10 pages).

Liu et al., "The decrease in the IgG-binding capacity of intensively dry heated whey proteins is associated with intense Maillard reaction, structural changes of the proteins and formation of RAGE-ligands," Food Funct., 2016, vol. 7, pp. 239-249 (24 pages).

Smith et al., "The false alarm hypothesis: Food allergy is associated with high dietary advanced glycation end-products and proglycating dietary sugars that mimic alarmins", J Allergy CLin Immunol, 2016 (9 pages).

Teodorowicz et al., "Food Processing: The Influence of the Maillard Reaction on Immunigenicity and Allergenicity of Food Proteins", Nutrients, vol. 9, 2017, (18 pages).

(56) References Cited

OTHER PUBLICATIONS

Henri J. Huttunen et al. "Receptor for Advanced Glycation End Products-binding COOH-terminal Motif of Amphoterin Inhibits Invasive Migration and Metastasis"; Cancer Research 62, 4805-4811, Aug. 15, 2002.

\* cited by examiner
† cited by third party

HYPOALLERGENIC INFANT FORMULA AND METHODS FOR PREPARING THE SAME

CROSS-REFERENCE TO RELATED APPLICATIONS

This application is a continuation of International Application No. PCT/EP2019/050890 filed Jan. 15, 2019, which claims the benefit of and priority to European Application No. 18151910.9 filed Jan. 16, 2018, both of which are hereby incorporated by reference herein in their entireties.

TECHNICAL FIELD OF THE INVENTION

The invention relates to the field of infant nutritional formulations. More in particular, it relates to methods for providing a hypoallergenic nutritional composition based on cow's milk protein for infants who are at risk of developing cow's milk allergy (CMA).

BACKGROUND OF THE INVENTION

A large number of infant formulas are based on proteins from cow's milk. Bovine milk proteins however, are known to give rise to allergic manifestations in a small percentage of the population; estimates range from 0.1% to 8%. The estimated prevalence of cow's milk allergy (CMA) varies between 0.25% and 4.9%, being higher in children than adults. CMA results from an immunological reaction to one or more milk proteins. This immunological basis distinguishes CMA from other adverse reactions to cow's milk protein such as lactose intolerance. CMA may be immunoglobulin E (IgE) or non-IgE-mediated and may be a manifestation of the atopic constitution and be accompanied by additional food allergies. Reactions to other foods (depending on the regional dietary intake) may occur in combination with CMA. Non-IgE-mediated disorders usually involve T-cells (or eosinophils), present mainly with gastrointestinal symptoms and are less likely to develop multiple food allergies. IgE- and non-IgE-mediated mechanisms may play a role in the pathogenesis of atopic dermatitis and the eosinophilic gastrointestinal disorders (EGIDs). Common allergenic response include diarrhoea, vomiting, intestinal disorders, respiratory problems, dermatitis, irritability, restlessness and loss of appetite. beta-Lactoglobulin (absent in human milk) is the most frequent cause of milk sensitivity.

The allergenic potential of cow milk-protein based formulas can be reduced by protein hydrolysis. In fact, hydrolysed proteins are vital in formulas for infants diagnosed with an allergy to bovine milk proteins or identified as being in the allergy risk group. During the hydrolysis process, allergy-causing areas on a protein (epitopes) are destroyed or reduced to a minimum. Animal studies have shown that partial hydrolysates can induce oral tolerance to intact proteins. Oral tolerance is the active non-response of the immune system to an allergen administered orally. If oral tolerance fails, food allergy occurs, which means oral tolerance is a critical process in the first few months of life.

There are two milk protein hydrolysate categories for use in infant nutrition. In extensive hydrolysates, almost all epitopes are destroyed such that they can be used in infants that are known to suffer from CMA. In contrast, partial protein hydrolysates still contain a minimal number of epitopes. The partial hydrolysates are typically considered ideal for allergy prevention and comfort in non-allergic infants, for example infants who are susceptible to developing CMA.

To ideally meet the composition of human milk, the cow milk protein in infant formulas should contain both whey protein and casein in an appropriate ratio. While a number of products based on intact milk protein meet a desirable whey protein to casein ratio, majority of the commercially available partially hydrolyzed formulas are based on 100% whey protein.

Processes for the preparation of partial whey protein hydrolysates are well known in the art, and generally involve multi-step hydrolysis and physical separations after the hydrolysis to eliminate enzymes and/or residual proteins. Most processes also involve constant pH control during hydrolysis.

A publication by Boyle et al. (BMJ 2016; 352:i974) called into question whether or not hydrolysed formulas are effective in reducing the risk of allergic or autoimmune disease. Based on a systematic review and meta-analysis on 37 intervention trials of hydrolysed formula, including over 19,000, participants, it was concluded that there was no overall consistent evidence that partially or extensively hydrolysed formulas reduce risk of allergic or autoimmune outcomes in infants at high pre-existing risk of these outcomes. Notably, the authors conclude that there was no evidence to support the health claim approved by the US Food and Drug Administration that a partially hydrolysed formula could reduce the risk of eczema nor the conclusion of the Cochrane review that hydrolysed formula could allergy to cows' milk.

SUMMARY OF THE INVENTION

In an attempt to better understand the functionality of currently marketed partial milk protein hydrolysates, the present inventors set out to decipher the presence of potential components causing immunogenicity and/or allergenicity. It was surprisingly observed that several conventional partial hydrolysates contain proteinaceous aggregates that can bind to RAGE, the receptor for AGEs (advanced glycation end products) which is highly expressed on DCs, macrophages, T lymphocytes, and B cells, as well as mast cells and basophils. As discussed in Teodorowicz et al. (2016) and Smith et al. (2017), RAGE activation by dietary AGEs is known to be involved in mediating allergenic and immunogenic effects of (processed) food proteins.

In addition, using an in vitro basophil assay, the partial milk hydrolysates were found to induce degranulation, a process that results in the exocytosis of allergic mediators. Notably, removal of high molecular weight (glycated) aggregates from the partial hydrolysates significantly reduced both the RAGE binding and the degranulation of basophilic granulocytes.

DETAILED DESCRIPTION OF THE INVENTION

Herewith, the inventors provided an improved partial milk protein hydrolysate for use as nutritional ingredient in infants who are at risk of developing CMA. The terms "susceptible" and "at risk" as used herein, unless otherwise specified, mean having little resistance to a certain condition or disease, including being genetically predisposed, having a family history of, and/or having symptoms of the condition or disease. For example, infants having at least one close family member who suffers from an allergy are at risk of developing CMA. Such an infant formula with reduced allergenicity is furthermore regarded as having prophylactic benefits in that it can delay or prevent sensitization which could otherwise lead to clinical symptoms of allergy.

In one embodiment, the invention provides a method for providing a hypoallergenic nutritional composition for infants who are at risk of developing cow's milk allergy (CMA), comprising the steps of:
  (i) providing a partial hydrolysate of the milk protein(s), obtained by subjecting a starting composition comprising one or more bovine milk protein(s) in an aqueous medium to an enzymatic treatment,
  (ii) clearing the partial hydrolysate from one or more components capable of RAGE-binding and/or having a basophil degranulation inducing capacity;
  (iii) optionally concentrating the cleared partial hydrolysate; and
  (iv) formulating the (concentrated) cleared partial hydrolysate into a nutritional composition for infants who are at risk of developing CMA.

In a specific embodiment, the invention provides a method for providing a hypoallergenic nutritional composition for infants who are at risk of developing cow's milk allergy (CMA), comprising the steps of:
  (i) providing a partial hydrolysate of the milk protein(s), obtained by subjecting a starting composition comprising one or more bovine milk protein(s) in an aqueous medium to an enzymatic treatment,
  (ii) clearing the partial hydrolysate from one or more components capable of RAGE-binding and/or having a basophil degranulation inducing capacity;
  (iii) optionally concentrating the cleared partial hydrolysate; and
  (iv) formulating the (concentrated) cleared partial hydrolysate into a nutritional composition for infants who are at risk of developing CMA;
wherein the clearing step (ii) comprises filtration of the partial hydrolysate using a membrane having a molecular cut-off in the range of 10-100 kDa and recovering the filtrate comprising a cleared partial hydrolysate.

In another specific embodiment, the invention provides a method for providing a hypoallergenic nutritional composition for infants who are at risk of developing cow's milk allergy (CMA), comprising the steps of:
  (i) providing a partial hydrolysate of the milk protein(s), obtained by subjecting a starting composition comprising one or more bovine milk protein(s) in an aqueous medium to an enzymatic treatment,
  (ii) clearing the partial hydrolysate from one or more components capable of RAGE-binding and/or having a basophil degranulation inducing capacity;
  (iii) optionally concentrating the cleared partial hydrolysate; and
  (iv) formulating the (concentrated) cleared partial hydrolysate into a nutritional composition for infants who are at risk of developing CMA;
wherein the clearing step (ii) comprises size exclusion chromatography of the partial hydrolysate and recovering the filtrate comprising a cleared partial hydrolysate.

In a preferred embodiment the clearing step (ii) comprises filtration of the partial hydrolysate using a membrane having a molecular cut-off in the range of 10-100 kDa and recovering the filtrate comprising a cleared partial hydrolysate. In this embodiment it is further preferred that the membrane has a molecular weight cut-off in the range of 10 to 50 kDa, more preferably in the range of 10 to 20 kDa. In one embodiment, the partial hydrolysate is obtained from one or more bovine milk protein(s) selected form the group consisting of whey proteins, acid whey protein, sweet whey proteins, whey protein concentrates, whey protein isolate, demineralized whey powder and caseinates. For example, the partial protein hydrolysate comprises or is a partial whey protein hydrolysate, the partial protein hydrolysate comprises or is partial beta-lactoglobulin hydrolysate and/or partial alpha-lactalbumin hydrolysate, or the partial protein hydrolysate comprises or is a partial casein hydrolysate.

The source of the whey protein may be acid whey, sweet whey, whey protein isolate or mixtures thereof. In one embodiment, the protein source is based on whey protein isolate or modified sweet whey. Sweet whey is a readily available by-product of cheese making and is frequently used in the manufacture of infant formulas based on cows' milk. However, sweet whey includes caseino-glyco-macropeptide (CGMP), a component which is undesirably rich in threonine and poor in tryptophan. Removal of the CGMP from sweet whey results in a protein fraction with a threonine content closer to that of human milk. A process for removing CGMP from sweet whey is described in EP 880902. If modified sweet whey or whey protein isolate is used as the protein source, it may be supplemented by free histidine in an amount of from 0.1 to 3% by weight of the protein.

In a specific aspect, the partial hydrolysate is obtained from a whey protein concentrate.

As used herein, the expression "partial hydrolysate" refers to a hydrolysate that is to be distinguished from extensively hydrolysed protein hydrolysates known in the art as nutritional ingredient for infants suffering from CMA. In one embodiment, the partial hydrolysate has a degree of hydrolysis (DH) in the range of from about 5 to 20%, wherein DH is determined by methods known in the art, for example by formal titration or AN/TN. In a preferred embodiment, the method of the invention uses a partial hydrolysate, having a DH of 6 to 18%, more preferably 8-15%. In a specific aspect, the partial hydrolysate is obtained from a WPC and has a DH in the range of 5-14%, preferably 7-11%.

The bovine milk protein(s) may be hydrolysed in any suitable manner known in the art. Typically, the enzymatic treatment comprises exposure of the starting composition comprising one or more milk proteins to one or more endo- and exoproteases, during a time period of 2.5-24 hours, at a pH 6-8 and a temperature in the range of 45-60° C.

For example, the starting material—as such or in a suitable form such as a solution or suspension—is then treated with a combination of at least one endo- and at least one exoproteinase, in which said enzyme mixture is added in an amount of 0.1-5%. In one embodiment, the starting material is a composition comprising one or more milk proteins in an aqueous medium at a protein content in the range of 10 to 20 wt %. The endo- and exoproteinases can be used sequentially—e.g. in two or more separate hydrolysis steps—or simultaneously, e.g. as a suitable mixture in a single hydrolysis step, optionally in combination with one or more further hydrolysis steps using any remaining enzymes. Preferably, the hydrolysis comprises a single hydrolysis step using a combination of all enzymes to be used.

In one embodiment, as the endo- and exoproteinases, a suitable mixture of serine proteases is used, including an enzyme mixture containing (at least) the enzymes Alcalase and Trypsine. Another enzyme suitable for use in said enzyme mixture is Flavourzyme. In one embodiment, a mixture of Alcalase, Flavourzyme and Trypsine is used.

Using the appropriate enzyme(s), e.g. a mixture of endo- and exoproteinase, the starting material can be hydrolysed at a temperature of about 45-60° C., preferably between 50 and 58° C., for less than 4 hours, preferably from 1.5 to 3 hours. During the hydrolysis, the pH is typically kept in the range of 6.4 to 8, and preferably kept essentially constant, e.g. in the range of 6.8 to 7.8.

If a whey fraction is used as the starting material that is substantially lactose free, it can be found that the protein suffers much less lysine blockage during the hydrolysis and subsequent thermal processing. This enables the extent of lysine blockage to be reduced from about 15% by weight of total lysine to less than about 10% by weight of lysine; for example about 7% by weight of lysine blockage which greatly improves the nutritional quality of the protein source.

In one embodiment of the invention, a method of the invention comprises providing a partial bovine milk protein hydrolysate comprising at least 10 wt. % of peptides with a size of 5 kDa or above, and at least 15 wt. % of peptides with a size in the range of 1 up to 5 kDa.

For example, the size distribution of the peptides in the partial protein hydrolysate is 40 to 60%<1 kDa, 10 to 14% 1 to <2 kDa, 8 to 16% 2 to <5 kDa, 3 to 7% 5 to <10 kDa, and 8 to 12%>10 kDa, based on dry weight of peptides present in partial protein hydrolysate.

A method of the invention is characterized in that it comprises the clearing of a partial bovine milk protein hydrolysate from one or more unwanted components (aggregates) capable of binding to RAGE, the receptor for advanced glycation end products (AGEs), i.e. components/aggregates having RAGE-binding characteristics, presumably due to the presence of advanced glycation end products (AGEs) and/or having a basophil degranulation inducing capacity, thereby reducing the allergenic/immunogenic potential of the hydrolysate.

In one aspect, one or more components (aggregates) having RAGE-binding activities are removed. The presence (or absence) of RAGE-binding components can be determined using methods known in the art, for example using a soluble Receptor of Advanced Glycation End-Products (sRAGE) in a Human ELISA. sRAGE test kits are marketed by BioVendor.

Additionally or alternatively, the presence and/or removal of AGEs can be detected by methods known in the art. For example, N-carboxymethyllysine (CML) can be analyzed as a marker of AGEs using a HPLC/FLD method with o-phtalaldehyde pre-column-derivatization (Lee et al., 2016 The FASEB Journal, vol. 30 no. 1 Supplement 673.8)

Alternatively or additionally, one or more components (aggregates) having a basophil degranulation inducing capacity (evidenced e.g. using the known in vitro assay using RBLs) are removed. In yet another embodiment, RAGE-binding components (aggregates) as well as components having a basophil degranulation inducing capacity are removed.

In one embodiment, the clearing step (ii) comprises filtration of the partial hydrolysate using a membrane having a molecular cut-off in the range of 10-100 kDa, and recovering the filtrate comprising a cleared partial hydrolysate. Good results are obtained using a membrane having a molecular cut-off in the range of 10 to 50 kDa, preferably in the range of 10 to 20 kDa. In a preferred embodiment, the clearing step (ii) comprises filtration of the partial hydrolysate using a membrane having a molecular cut-off of 10 kDa.

The person skilled in the art will appreciate that, according to the invention, any type of filtration technology may be used to remove one or more unwanted components. For example, a method provided herein may involve microfiltration (MF), Ultra filtration (UF), Carbon filtration or polish filtration. Very good results can be obtained using ultrafiltration.

Following filtration, the cleared partial hydrolysate can be concentrated to a high dry solids content by methods known in the art, e.g. by thermal processing such as spray-drying.

The skilled person will appreciate that other techniques may be used in clearing step (ii). In another embodiment, clearing step (ii) comprises size exclusion chromatography of the partial hydrolysate and recovering the filtrate comprising a cleared partial hydrolysate. In this embodiment, components having a molecular weight of 100 kDa or higher are removed via size exclusion chromatography. The cleared partial hydrolysate can be concentrated to a high dry solids content by methods known in the art, e.g. by thermal processing such as spray-drying.

In step (iv) of a method herein disclosed, the (concentrated) cleared partial bovine milk protein hydrolysate is formulated into a nutritional composition for infants who are at risk of developing CMA. The (concentrated) cleared partial bovine milk protein hydrolysate is typically used "as such" in the final nutritional product, without further fractionation or purification.

Preferably, the (concentrated) cleared partial bovine milk protein hydrolysate is formulated into a hypoallergenic infant formula, more preferably an infant formula for use by infants aged over four months.

The invention thus also provides a hypoallergenic nutritional composition for infants obtainable by a method as herein disclosed. More specifically, the invention provides a hypoallergenic nutritional composition, also referred herein as "hypoallergenic infant formula" intended for particular nutritional use by infants during the first year of life and satisfying by itself the nutritional requirements of this category of person, as defined in European Commission Directive 91/321/EEC of May 14, 1991. The term "infant formula" includes starter infant formula and follow-on formula. The term "starter infant formula" means a foodstuff intended for particular nutritional use by infants during the first four to six months of life. The term "follow-on formula" means a foodstuff intended for particular nutritional use by infants aged from four to six months, up to 12 months, and constituting the principal liquid element in the progressively diversified diet of this category of person.

An infant formula of the present invention may comprise from 1.0 to 2.0 grams of partially hydrolysed whey protein per 100 ml of ready to consume formula, more preferably from 1.5 to 1.9 g/100 ml.

An infant formula according to the present invention may contain a carbohydrate source. Any carbohydrate source conventionally found in infant formulae such as lactose, saccharose, maltodextrin, starch and mixtures thereof may be used although the preferred source of carbohydrates is lactose. Preferably the carbohydrate source contributes between 35 and 65% of the total energy of the formula.

The infant formula generally contains a source of lipids. In this case, the lipid source may be any lipid or fat which is suitable for use in infant formulae. Preferred fat sources include milk fat, safflower oil, egg yolk lipid, canola oil, olive oil, coconut oil, palm kernel oil, soybean oil, fish oil, palm oleic, high oleic sunflower oil and high oleic safflower oil, and microbial fermentation oil containing long-chain, polyunsaturated fatty acids. In one embodiment, anhydrous milk fat is used. The lipid source may also be in the form of fractions derived from these oils such as palm olein, medium chain triglycerides, and esters of fatty acids such as arachidonic acid, linoleic acid, palmitic acid, stearic acid, docosahexaeonic acid, linolenic acid, oleic acid, lauric acid, capric acid, caprylic acid, caproic acid, and the like. It may also be added small amounts of oils containing high quantities of preformed arachidonic acid and docosahexaenoic acid such as fish oils or microbial oils. The fat source preferably has a ratio of n-6 to n-3 fatty acids of about 5:1 to about 15:1; for example about 8:1 to about 10:1. In an embodiment, the infant formula has an energy density comprised from 600 kcal/L to 780 kcal/L, preferably from 630 kcal/L to 700 kcal/L. In total, the fat content is preferably such as to contribute between 30 to 55% of the total energy of the formula.

In a specific aspect, the infant formula comprises an oil mix comprising palmitic acid esterified to triacylglycerols, for example wherein the palmitic acid esterified in the sn-2 position of triacylglycerol is in the amount of from 20% to 60% by weight of total palmitic acid and palmitic acid esterified in the sn-1/sn-3 position of triacylglycerol is in the amount of from 40% to 80% by weight of total palmitic acid.

The infant formula may also contain all vitamins and minerals understood to be essential in the daily diet and in nutritionally significant amounts. Minimum requirements have been established for certain vitamins and minerals. Examples of minerals, vitamins and other nutrients optionally present in the infant formula include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form. The presence and amounts of specific minerals and other vitamins will vary depending on the intended infant population.

In a specific aspect, a method according to the invention comprises including at least one ingredient selected from the group consisting of galacto-oligosaccharides (GOS), human milk oligosaccharides (HMOs), in particular 2'-fucosyllactose (2'-FL) and/or 6'-sialyllactose, and TGF-β.

In one embodiment, the infant formula comprises at least galacto-oligosaccharides (GOS).

In another embodiment, the infant formula comprises at least human milk oligosaccharides (HMOs), preferably a HMO selected from the group consisting of sialyllactose, fucosyllactose, di-sialylated oligosaccharides, lacto-N-neotetraose (LNnT), lacto-N-tetraose (LNT), lacto-N-fucopentaose (LNFP)-isomers, lacto-N-difucohexaose (LNDFH)-isomers, fucosyllacto-N-hexaose (F-LNH)-isomers, difucosyllacto-N-hexaose (DF-LNH)-isomers and trifucosyllacto-N-hexaose (TF-LNH)-isomers (see also WO2013/025104A1). The sialyllactose may originate from bovine milk. In a particularly preferred embodiment, the formula comprises 2'-fucosyllactose (2'-FL) and/or 6'-sialyllactose (6'-SL).

An infant formula of the present invention may contain from 50 to 1000 nanograms of TGF-β per 100 ml of ready to consume infant formula, more preferably from 50 to 500 nanograms per 100 ml and most preferably 200 to 300 nanograms per 100 ml. Preferably, an infant formula of the present invention contains both TGF-@1 and TGF-@2, more preferably in a ratio between 1:5 and 1:50.

TGF-β may be added to the formula in the form of a polypeptide growth factor isolated from milk by methods known in the art, for example as described for example in EP1218410 B1. Alternatively, a recombinant TGF-β may be used if preferred.

If necessary, the infant formula may contain emulsifiers and stabilisers such as soy lecithin, citric acid esters of mono- and di-glycerides, and the like.

The infant formula may optionally contain other substances which may have a beneficial effect such as lactoferrin, nucleotides, nucleosides, and the like.

In another aspect of the present invention, the invention relates to a method for clearing a partial hydrolysate of milk protein(s) from one or more components capable of RAGE-binding and/or having a basophil degranulation inducing capacity, the method comprising the steps of:
(i) providing a partial hydrolysate of the milk protein(s), obtained by subjecting a starting composition comprising one or more bovine milk protein(s) in an aqueous medium to an enzymatic treatment; and
(ii) clearing the partial hydrolysate from one or more components capable of RAGE-binding and/or having a basophil degranulation inducing capacity; and
(iii) optionally concentrating the cleared partial hydrolysate;

wherein the clearing step (ii) comprises filtration of the partial hydrolysate using a membrane having a molecular cut-off in the range of 10-100 kDa and recovering the filtrate comprising a cleared partial hydrolysate; or
wherein the clearing step (ii) comprises size exclusion chromatography of the partial hydrolysate and recovering the filtrate comprising a cleared partial hydrolysate.

In a preferred embodiment the clearing step (ii) comprises filtration of the partial hydrolysate using a membrane having a molecular cut-off in the range of 10-100 kDa and recovering the filtrate comprising a cleared partial hydrolysate. In this embodiment it is further preferred that the membrane has a molecular weight cut-off in the range of 10 to 50 kDa, more preferably in the range of 10 to 20 kDa.

In another embodiment, clearing step (ii) comprises size exclusion chromatography of the partial hydrolysate and recovering the filtrate comprising a cleared partial hydrolysate. In this embodiment, components having a molecular weight of 100 kDa or higher are removed via size exclusion chromatography.

The term "partial hydrolysate" is described in more detail above. The partial hydrolysate and preferred embodiments thereof are described in more detail above. These preferred embodiments also apply to the method for clearing a partial hydrolysate of milk protein(s) from one or more components capable of RAGE-binding and/or having a basophil degranulation inducing capacity according to the invention.

The present invention further relates to a partial hydrolysate of milk protein(s) obtainable by the method for clearing a partial hydrolysate of milk protein(s) from one or more components capable of RAGE-binding and/or having a basophil degranulation inducing capacity according to the invention.

The present invention also relates to a partial hydrolysate of milk protein(s) according to the invention, for use in administration to an infant or young child being genetically predisposed and/or having a family history of developing CMA.

EXPERIMENTAL SECTION

Figure 1:
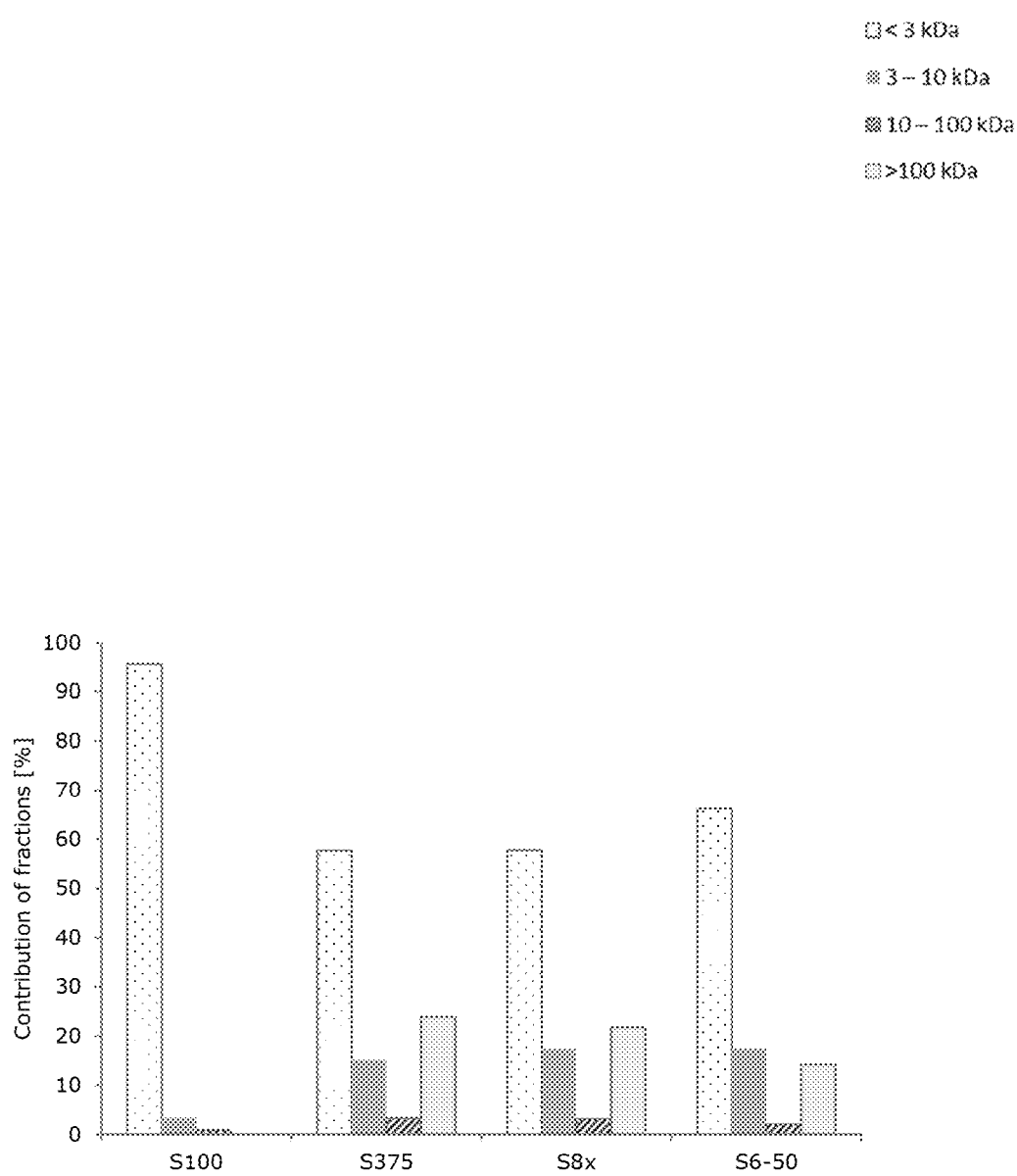
FIG. 1. Relative contributions of the different MW fractions, after fractionation of the milk protein hydrolysates S100, 5375, S8x and S6-50 on centrifugal Filter Units. Data are based on protein concentrations and volumes of the obtained fractions.

Example 1: Size Separation of Partial Milk Protein Hydrolysates

This example shows the fractionation of partial milk protein hydrolysates into fractions of different sizes.

The following hydrolysates were used:
S8x, S6-50 and 5375 are spray-dried partial hydrolysates obtained from whey protein concentrate (WPC), and having a degree of hydrolysis of about 9.2%. 5100 is a spray-dried extensive hydrolysate obtained from WPC, and having a degree of hydrolysis of about 15%.

Size Fractionation

The four different partial milk protein hydrolysates were dissolved in MilliQ at a protein concentration of 50 mg/mL. After dissolving for 15 minutes under shaking, the samples were centrifuged (2000 g, 10 min. 20° C.). Afterwards, the samples were incubated at 4° C. for 15 minutes to allow the formation of a separate aqueous layer and fat layer. The aqueous layer was carefully removed and the fat layer was discarded. The remaining pellets were dissolved in fixed volumes of either PBS, Tris/urea (0.05M/6M) or in Tris/urea (0.05M/6M) with additional dithioerythritol (DTE, 5 mg/mL). Protein concentrations of the fractions obtained were determined by absorption measurements at 280 nm, using a Nanodrop system (ThermoScientific).

The proteins in the aqueous layer obtained from the samples were separated on basis of their size using Centrifugal Filter units. After filter washing, 60 mg of dissolved protein was loaded in an Amicon Centrifugal Filter Unit (Millipore) with a molecular weight cut-off of 10 kDa. The samples were centrifuged for 10 minutes, 3363 g at RT. The retentate was resuspended and the centrifugation step was repeated. The protein concentration of the permeate was controlled after each centrifugation step. The process was repeated until the protein concentration in the permeate was not detectable. Both fractions (retentate and permeate) were collected and the fractionation process was continued. Fractionation on filter units with a molecular weight cut-off of 3 kDa was performed as described above on protein fractions that passed the 10 kDa filters. The fraction that did not pass the 10 kDa filter was subjected to fractionation on a 100 kDa filter. Sample S100 was not subjected to fractionation on 100 kDa filters. In contrast to the fixed amount of protein used for the fractionation on the 10 kDa filters, variable amounts of protein were used on the 3 kDa and 100 kDa filters. Relevant fractions were pooled and stored at −20° C. until further use.

HPLC Analysis of Fractionated Hydrolysates

Different fractions of the fractionated samples were subjected to Size Exclusion Chromatography (SEC) analysis. A Waters Acquity UPLC protein column with particle size 1.7 μm and pore size 200 Å was used. Isocratic flow (0.3 mL/min) with PBS (100 mM, pH 6.8+150 mM NaCl) was applied. A 10 μL sample was injected and proteins were detected by UV absorbance at 214 nm.

UV-VIS and Fluorescence Measurements

Experimental milk hydrolysates were subjected to absorbance and fluorescence measurements. Samples were diluted to either 0.5.0 or 2.5 mg protein/mL in MilliQ. Samples were pipetted in wells of a 96 well plate (low binding, 100 μL/well). Absorbance was measured at 294 nm and 490 nm.

In a parallel experiment, samples were pipetted in wells of a white 96 well plate. After determining the optimum excitation and emission wavelengths, sample fluorescence was assessed at 440 nm, with excitation at 350 nm.

In order to study any size dependent aspects of milk protein hydrolysates, the samples were fractionated using Amicon Filter Units with cut-off values: 10 kDa, 3 kDa and 100 kDa. The contribution of the different factions is shown in FIG. 1. Hydrolysate S100 mostly consists of small (<3 kDa) peptides and proteins. In contrast, hydrolysates 5375, S8x and S6-50 contain a significant amount of larger proteins as well, especially those size between 3 and 10 kDa, but also those sized >100 kDa. As S375, S8x and S6-50 are derived from a similar source, similarity between those samples is expected.

Figure 2:
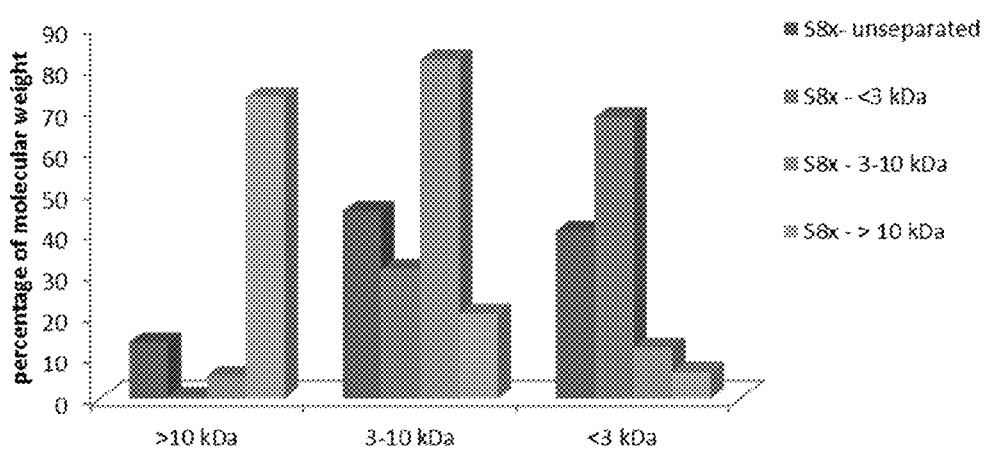
FIG. 2. Analysis of whey protein hydrolysate fractions by SEC. Whey protein hydrolysate (S8x) was fractionated by Filter Units, followed by fraction analysis by SEC. x-axis: fractions, obtained by fractionation on Filter Units; y-axis: results from SEC. Data have been normalized to 100%.

The accuracy of the fractionation was controlled by size exclusion chromatography (SEC) and the results are presented in FIG. 2. The SEC analysis revealed that the majority of proteins is classified correctly by Filter Unit fractionation. This holds for all size classes (<3 kDa, 3-10 kDa and >10 kDa) for all tested samples. Of all the proteins that pass the 3 kDa filter, up to 30% have a molecular weight between 3 and 10 kDa and are thus classified wrongly by Filter Unit analysis. The 3-10 kDa fractions and the >10 kDa fractions show presence of smaller size proteins as well, up to 20% (3-10 kDa fraction) and up to 30% (>10 kDa fraction). Taken together, that data show that the method of protein fractionation by Filter Unit centrifugation allows to fractionate milk hydrolysates with an accuracy of about 70%-85%.

Example 2: Partial Milk Protein Hydrolysates Contain Aggregates that Bind to sRAGE sRAGE Inhibition Assay The sRAGE binding capacity of different milk protein hydrolysates was assessed by a competition assay, as described before by Liu et al. (Liu F, et al. Food Funct. 2016 January; 7(1):239-49; Liu F, et al., J Agric Food Chem. 2016 Aug. 24; 64(33):6477-86).

In short, high protein binding 96 well plates (Greiner Bio-one) were coated overnight with glycated soy protein extract (20 µg/mL) at 4° C. and 100 µL/well. A 200 mM sodium carbonate buffer at pH 9.6 was used as coating buffer. sRAGE (soluble Advanced Glycation End product-specific receptor, produced in $E.$ $coli$, Biovendor) was dissolved in 0.1M acetic acid at pH 4.0 and used as AGE binding protein. Samples fractions were initially diluted in PBS with 1.5% BSA and 0.025% Tween-20. The obtained concentration was diluted serially, pre-incubated with the sRAGE (1.25 µg/mL) and incubated at 37° C. After 45 minutes of incubation, 200 µL of the protein-sRAGE mixture was transferred to the coated plate, which was blocked with 3% BSA in PBS for 1 hour and washed afterwards. After 1 h. of incubation, at 37° C., the protein-sRAGE mixture was discarded and the wells were washed with PBS+0.05% Tween-20. Anti-sRAGE antibody (monoclonal mouse IgG, 0.5 µg/mL) was added to the wells (0.5 µg/mL, 80 µL) and the plates were incubated for 30 minutes, shaking at room temperature. After washing, the detection antibody (polyclonal goat anti-mouse, HRP coupled, 0.5 mg/mL) was added and incubated for 30 minutes at room temperature. Final washing was followed by incubation with TMB (80 µL/well) for 3 minutes. The colouring reaction was stopped by addition of 100 µL of 2% HCl. The absorbance was read at 450 nm, with 620 nm. as reference. Results are expressed as % of inhibition with reference to the positive control, G90 (50 µg/mL). Ovalbumin (Invivogen) was used as negative control.

In this system, addition of RAGE binding aggregates can inhibit the interaction of glycated soy with sRAGE, and are expressed as % inhibition.

Figure 3A:
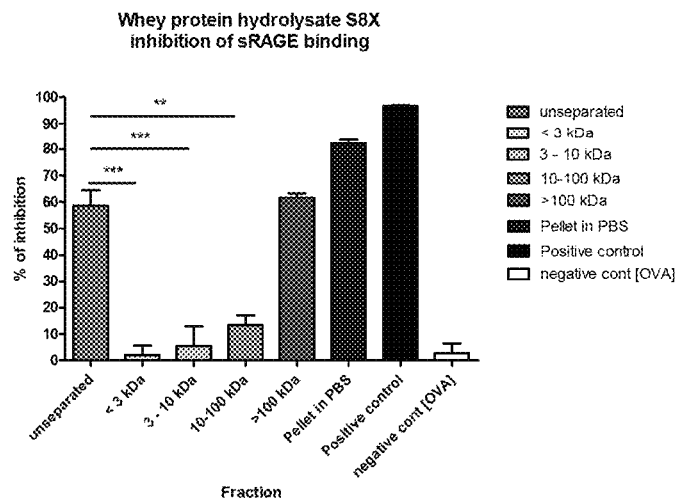
FIGS. 3A and 3B. sRAGE inhibition assay on different fractions of hydrolysates S8X (FIG. 3A) and S100 (FIG. 3B). Whey derived protein samples were dissolved in MilliQ, fractionated and subjected to the sRAGE assay. Results are averages of triplicates. Levels of significance are given with respect to total liquid or with respect to each other. CML: carboxy-methyl lysine. G90: positive control. OVA: negative control (ovalbumin). Results were analysed by ANOVA (one way analysis of variance), followed by a Tukey post-test. All analyses were carried out in Graphpad Prism software (version 5.03). Data are shown as average+ standard deviation. In all cases, the level of significance is indicated by stars, *: $p \leq 0.05$; : $p \leq 0.01$; *: $\leq 0.001$.
Figure 3B:
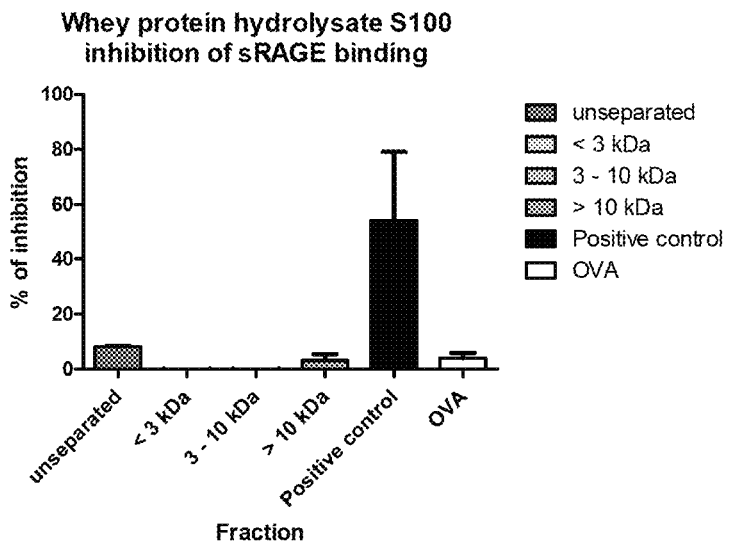

The fractionated samples of exemplary hydrolysates S8x and S100 (see Example 1) were tested for inhibition of binding of sRAGE to glycated soy proteins. The results are shown in FIGS. 3A and 3B. Whereas the unfractionated partial hydrolysate significantly inhibits the sRAGE binding, all fractions cleared with filters for proteins<100 kDa were found to hardly contribute to this inhibition. In contrast, the >100 kDa fraction shows an inhibition that is similar to the inhibition unseparated hydrolysates. Hydrolysate S100 that did not contain any protein fractions>10 kDa could not inhibit sRAGE binding (FIG. 3B).

Example 3: Induction of Degranulation of Basophilic Granulocytes by Aggregates Present in Milk Protein Hydrolysates Human Serum from Milk Allergic Patients Human serum from milk allergic patients was received from Rijnstate Hospital (Arnhem, The Netherlands). Equal volumes of three different patients were pooled. Specific IgE levels were determined for each of the patients. The determined values are shown in Table 1.

TABLE 1

Specific IgE levels towards different milk proteins determined using the ImmunoCAP (Phadia AB, Uppsala, Sweden).

| Patient | Cow's milk [ku/L] | Casein [kU/L] | α-lactalbumin [kU/L] | β-lactoglobulin [kU/L] |
|---|---|---|---|---|
| 1 | 65.5 | | | |
| 2 | 328 | >100 | 33.4 | 30.4 |
| 3 | 2.62 | 1.58 | 1.58 | 0.72 |

IgG Removal

IgG was removed from human serum by spin centrifugation. Protein G, coupled to agarose was equilibrated and placed in a 15 mL collection tube, in accordance with the protocol. The human serum was diluted 2× in binding buffer and loaded onto the agarose resin in the column and incubated for 10 minutes. Afterwards, the column was centrifuged (1000 g, 1 min.) and the flow through was stored. By adding additional binding buffer to the column, followed by centrifugation, the column was washed three times. Relevant wash fractions, based on their protein concentrations, were pooled. By adding elution buffer, the bound IgG was eluted from the column and discarded afterwards.

RBL Assay

Rat Basophil Leukemia (RBL) cells transfected with alpha subunit of the human IgE receptor (FcERI) were employed to assess the degranulation inducing capacity of different milk hydrolysate fractions. Cells were grown in MEM with 5% heat inactivated fetal bovine serum (FBS), 1% penicillin, 1% streptomycin and 1% glutamine at 37° C., 5% CO2. Cells were washed with MEM and scraped from the bottom of the flasks. The cells were washed twice in MEM by centrifugation (400 g, 5 min., RT) and resuspension in MEM. Afterwards, cells were seeded in 96 well plates at a density of $7.5 \times 10^4$/well in MEM+1% glutamine.

Once the cells adhered to the bottom of the wells, human serum from cow milk allergic patients was added to the cells. The pooled serum from 3 patients after removal of IgG was used (average of milk specific IgE of 132 kU/L, see Table 1). Typically, dilutions of 40× and 60× in MEM were applied to the cells. For positive controls, the cells were incubated with IgE (100 ng/mL) in MEM. After 24 h of incubation at 37° C., the cells were washed gently three times with 75 µL Tyrode's washing buffer (137 mM NaCl, 2.69 mM KCl, 0.415 mM NaH2PO4, 0.492 mM MgCl2, 2.72 mM CaCl2, 10.1 mM HEPES, 0.280 mM glucose and 1 g BSA/L, dissolved in H2O). After completing the washing steps, either anti-IgE (1.0-32 µg/mL) or diluted milk hydrolysate samples were added to the cells, 100 µL in each well. For this step, both the anti-IgE and the milk hydrolysates were dissolved in antigen challenge buffer (137 mM NaCl, 2.69 mM KCl, 0.415 mM NaH2PO4, 0.492 mM MgCl2, 2.72 mM CaCl2, 10.1 mM HEPES, 0.280 mM glucose and 1 g BSA/L, dissolved in 50% H2O and 50% D2O).

After 50 minutes of incubation, 100 µL Triton-X100 (1% in PBS) was added to the cells which served as positive controls for the total release. After 1 hour of incubation (37° C., 5% CO2), 60 µL of the supernatant of the cells was incubated with 50 µL substrate solution (3.80 mM p-nitro-N-acetyl-β-D-glucosaminide in 126 mM Na2HPO4, dissolved in $H_2O$ at pH 4.5 (adjusted with 0.4M citric acid)) for 1 hour at 37° C. The reaction was stopped by addition of 100 µL glycine (0.2 M, pH 10.7). The absorbance was measured at 405 nm with 620 nm as reference value.

The release of β-hexosaminidase from the RBL cells was evaluated after incubation of cells with fractionated hydrolysates. A whey protein concentrate (WPC) was used as the positive reference in all experiments.

Figure 4:
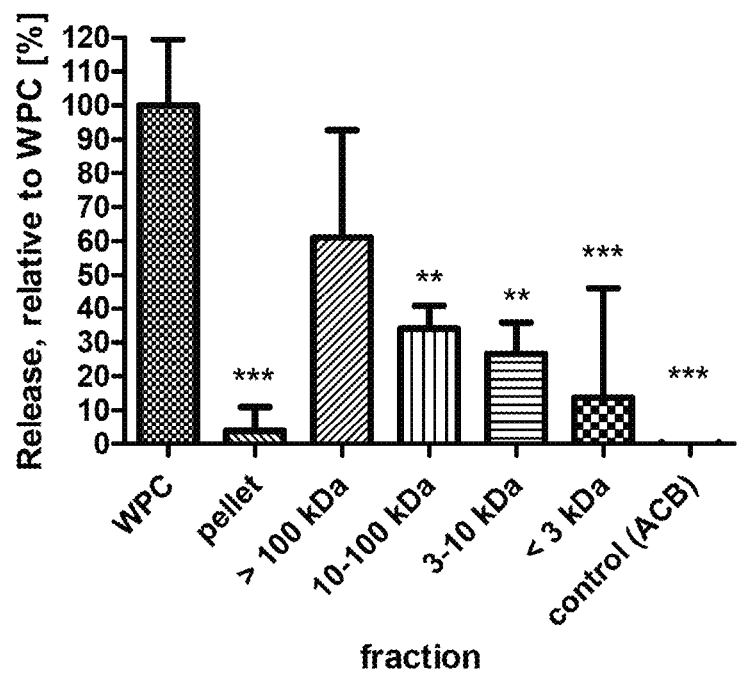
FIG. 4. β-hexosaminidase release from RBLs. RBLs were incubated with 60× diluted human serum depleted of IgG, for 24 hours, followed by washing and incubation with different fractions of hydrolysate S8x for 1 hour. The spontaneous release (in ACB) has been subtracted from all values. The absolute release values have been standardized with reference to the release of whey protein concentrate (WPC). The levels of significance are indicated with respect to WPC. Protein concentrations are determined by Nanodrop; ACB: antigen challenge buffer. Results were analysed by ANOVA (one way analysis of variance), followed by a Tukey post-test. All analyses were carried out in Graphpad Prism software (version 5.03). Data are shown as average with standard deviation. In all cases, the level of significance is indicated by stars, *: $p \leq 0.05$; : $p \leq 0.01$; *: $\leq 0.001$.

Results are shown in FIG. 4. Each of the fractions of exemplary hydrolysate S8x induced significantly less RBL release than WPC, apart from the fraction with a molecular weight>100 kDa. That fraction showed the largest RBL release, which equals 54% reduction with respect to the release induced by WPC. In contrast, fractions with a lower molecular weight caused lower β-hexosaminidase release, going down to 14% of the WPC for the fraction with a molecular weight<3 kDa proteins. The insoluble proteins from the pellet contributed hardly to RBL release.

Example 4: Manufacture of a Hypoallergenic (HA) Infant Formula

Preparation of a Partial Hydrolysate

A milk protein comprising whey protein concentrate (WPC) or casein is dissolved in water to a final protein concentration of 10-15% (w/w) at 50-60° C. The pH of the protein solution is adjusted to pH 6-8 by 45% potassium hydroxide (KOH) or sodium hydroxide (NaOH). Hydrolysis of the proteins is started by adding endopeptidase (Alcalase) and exopeptidase (Flavourzyme) to the protein solution in an enzyme/substrate (E/S) ratio of 1:50-1:500. The reaction mixture is held at 50-60° C. for 4-24 h. The enzyme reaction is stopped by heating the reaction mixture to 90° C. and subsequently, held the mixture at 90° C. for at least 10 min. After heating the mixture is cooled down to 10° C.

Clearing the Partial Hydrolysate

The partial hydrolysate is filtered over a membrane at 10° C. using a Amicon Centrifugal Filter Unit (Millipore) with a molecular weight cut-off of 100 kDa (10 minutes, 3363 g, RT). The retentate is resuspended in water and the centrifugation step is repeated until no protein is detectable at 280 nm in the permeate. The permeates fractions containing the cleared hydrolysate are pooled and subjected to further downstream processing.

Concentration of the Cleared Partial Hydrolysate

The cleared hydrolysate is concentrated until 40-60% dry matter content using rotation film evaporation at 30° C. applying a vacuum pressure of 60 mbar. The concentrated hydrolysate is spray dried using a Büchi bench-top spray drier applying an inlet temperature of 200° C. and an outlet temperature of 80° C.

Formulating the Cleared Partial Hydrolysate into an Infant Formula

The cleared and dried partial hydrolysate is formulated into infant formula for the age of 0-6 months to a final concentration as shown in Table 2. A good tasting infant milk formula comprises (per 100 g product) cleared whey or casein protein hydrolysate 6-16 wt %, a fat component 18-29 wt %, a carbohydrate content<60 wt %, prebiotic component 3-8 wt %. Further components like minerals, trace elements and vitamin are incorporated in amounts recommended by legislation.

Table 2 shows the composition of an exemplary nutritional formula according to the invention, e.g. infant formulas for the age group between 0-6 months, for supporting or enhancing the infant's immune system (HA infant formula) per 100 mL ready to drink.

TABLE 2

Composition of HA infant formula (per 100 ml)

| | g/100 mL |
|---|---|
| Energy, kcal | 67 |
| Protein (g) | 1.6 |
| Carbohydrates (g) | 7.0 |
| Fat (g) | 3.5 |
| Prebiotic (GOS) | 0.4 |
| Salts (g) | 0.05 |

The invention claimed is:

1. A method of manufacturing a hypoallergenic nutritional composition, comprising:
   (a) providing a partial hydrolysate of milk protein(s) by subjecting a starting composition comprising one or more bovine milk protein(s) in an aqueous medium to an enzymatic treatment, the partial hydrolysate having a degree of hydrolysis (DH) in the range of 5 to 20%,
   (b) clearing from the partial hydrolysate of milk protein(s) one or more aggregates capable of binding to receptor for advanced glycation end products (RAGE) and/or having a basophil degranulation inducing capacity, thereby forming a cleared partial hydrolysate; and
   (c) formulating the cleared partial hydrolysate into a hypoallergenic nutritional composition for infants;
   wherein the clearing comprises:
   (i) filtering the partial hydrolysate using a membrane having a molecular cut-off in the range of 50-100 kDa; or
   (ii) subjecting the partial hydrolysate to size exclusion chromatography thereby removing aggregates having a molecular weight of 100 kDa or higher.

2. The method according to claim 1, wherein the bovine milk protein(s) are selected from the group consisting of whey proteins, acid whey protein, sweet whey proteins, whey protein concentrates, whey protein isolate, demineralized whey powder and caseinates.

3. The method according to claim 1, further comprising concentrating the cleared partial hydrolysate.

4. The method according to claim 3, wherein the concentrating comprises spray-drying.

5. The method according to claim 1, wherein the partial hydrolysate has a degree of hydrolysis (DH) in the range of 7 to 11%.

6. The method according to claim 1, wherein the partial hydrolysate comprises at least 10 wt. % of peptides with a size of 5 kDa or above and at least 15 wt. % of peptides with a size in the range of 1 to 5 kDa.

7. The method according to claim 1, wherein the partial hydrolysate comprises
   peptides with a size distribution, based on dry weight of the peptides present in the partial protein hydrolysate:
   40 to 60% less than 1 kDa,
   10 to 14% 1 to less than 2 kDa,
   8 to 16% 2 to less than 5 kDa,
   3 to 7% 5 to less than 10 kDa, and
   8 to 12% greater than 10 kDa.

8. The method according to claim 1, wherein the filtering comprises microfiltration (MF), ultrafiltration (UF), carbon filtration or polish filtration.

9. The method according to claim 1, wherein the formulating comprises adding a source of carbohydrates, a source of lipids, vitamins, oligo-elements and minerals to the cleared partial hydrolysate.

10. The method according to claim 1, wherein the formulating comprises
   adding at least one ingredient selected from the group consisting of galacto oligosaccharides (GOS), human milk oligosaccharides (HMOs) and TGFβ to the cleared partial hydrolysate.

11. The method according to claim 1, wherein the formulating comprises
   adding 2'-fucosyllactose (2'-FL) and/or 6'-sialyllactose to the cleared partial hydrolysate.

12. A hypoallergenic nutritional composition obtainable by the method according to claim 1.

13. A method for preventing or delaying sensitization in an infant at risk of developing cow's milk allergy (CMA), comprising administering to the infant the hypoallergenic nutritional composition according to claim 12.

14. The method according to claim 13, wherein the infant at risk is genetically predisposed and/or has a family history of developing CMA.

* * * * *